US008152113B2

(12) United States Patent
Chen et al.

(10) Patent No.: US 8,152,113 B2
(45) Date of Patent: Apr. 10, 2012

(54) ADJUSTABLE SUPPORTING MECHANISM

(75) Inventors: Ku-Feng Chen, Taipei (TW); Hung-Ta Liao, Taipei (TW)

(73) Assignee: Compal Electronics, Inc., Taipei (TW)

( * ) Notice: Subject to any disclaimer, the term of this patent is extended or adjusted under 35 U.S.C. 154(b) by 554 days.

(21) Appl. No.: 12/272,815

(22) Filed: Nov. 18, 2008

(65) Prior Publication Data

US 2009/0127423 A1    May 21, 2009

(30) Foreign Application Priority Data

Nov. 21, 2007   (TW) ............................... 96144099 A

(51) Int. Cl.
*A47G 23/02* (2006.01)

(52) U.S. Cl. ..... 248/150; 248/371; 248/462; 248/176.3; 248/274.1; 361/679.02; 361/679.21; 361/679.23; 16/319; 16/321; 16/343; 40/747

(58) Field of Classification Search .................. 248/127, 248/122.1, 125.8, 125.9, 130, 131, 133, 149, 248/371, 372.1, 176.1, 176.3, 274.1, 309.1, 248/150, 165, 166, 292.12, 458, 460, 462, 248/463, 136, 447, 454, 455, 456; 16/319, 16/321, 326, 333, 337, 342, 343, 329, 367; 361/681, 679.01, 679.02, 579.21, 679.22, 361/679.23; 40/747
See application file for complete search history.

(56) References Cited

U.S. PATENT DOCUMENTS

| 5,329,712 | A | * | 7/1994 | Keller ............................ 40/747 |
| 5,436,792 | A | * | 7/1995 | Leman et al. ............ 361/679.44 |
| 6,570,627 | B1 | * | 5/2003 | Chang ........................... 348/794 |
| 6,651,943 | B2 | * | 11/2003 | Cho et al. .................... 248/122.1 |
| 6,966,532 | B2 | * | 11/2005 | Ishizaki et al. ............. 248/274.1 |
| 7,232,098 | B2 | * | 6/2007 | Rawlings et al. ............. 248/121 |
| 7,540,466 | B2 | * | 6/2009 | Yang ............................. 248/688 |
| 7,770,862 | B2 | * | 8/2010 | Chen ............................. 248/351 |
| 7,837,159 | B2 | * | 11/2010 | Tsuo et al. .................... 248/131 |
| 2006/0049327 | A1 | * | 3/2006 | Chen ............................. 248/371 |
| 2009/0026339 | A1 | * | 1/2009 | Chen ............................. 248/349.1 |
| 2010/0012809 | A1 | * | 1/2010 | Zeng et al. .................... 248/351 |

FOREIGN PATENT DOCUMENTS

| CN | 1681274 | 10/2005 |
| CN | 1805057 | 7/2006 |

OTHER PUBLICATIONS

1st Office Action of China Counterpart Application, issued on May 27, 2010, p. 1-p. 3.

* cited by examiner

*Primary Examiner* — Todd M Epps
(74) *Attorney, Agent, or Firm* — Jianq Chyun IP Office

(57) ABSTRACT

An adjustable supporting mechanism suitable for being connected to a body of an electronic apparatus, upholding the body on a plane, and adjusting the relative position of the body and the plane is provided. The adjustable supporting mechanism includes a base, a bearing, an elastomer, a rotating shaft, and a supporting stand. The base is capable of being connected to the body. The bearing is fixed on the base. The elastomer is fixed on the base. The rotating shaft fits the bearing and contacts the elastomer. The rotating shaft is capable of rotating with respect to the base and the elastomer. When the rotating shaft rotates, the elastomer applies a resistance on the rotating shaft for resisting the rotation of the rotating shaft. The supporting stand is fixed to the rotating shaft.

11 Claims, 20 Drawing Sheets

ADJUSTABLE SUPPORTING MECHANISM

CROSS-REFERENCE TO RELATED APPLICATION

This application claims the priority benefit of Taiwan application serial no. 96144099, filed on Nov. 21, 2007. The entirety of the above-mentioned patent application is hereby incorporated by reference herein and made a part of specification.

BACKGROUND OF THE INVENTION

1. Field of the Invention

The present invention generally relates to a supporting mechanism and an electronic apparatus using the same and, in particular, to an adjustable supporting mechanism and an electronic apparatus using the same.

2. Description of Related Art

With the advent of the digital age, many articles and devices are gradually getting digitalized, thus bringing great convenience. Digitalization includes replacing traditional media by digital media, such that the media has the advantages of no distortion, rapid replacement, high portability, being easily transported, and the like. A digital photo frame is a digital electronic apparatus using a flat panel display for displaying digital images to replace traditional photographic papers.

Before the digital photo frame is available in the market, when viewing digital photos, a screen of a personal computer (PC) is mostly used. However, one must spent time waiting the computer to boot when viewing the photos by the PC, and the screen and the host of the computer cannot conveniently placed at any places for decorating the indoor environment as desired. In comparison, the digital photo frame not only can be booted rapidly, but also can be placed at any places for various arrangements.

A conventional digital photo frame utilizes a fixed supporting mechanism to uphold the frame of the digital photo frame on a plane. However, the fixed supporting mechanism cannot change an incline angle of the frame of the digital photo frame with respect to the plane, thus limiting the arrangement of the digital photo frame. Further, digital photos include transversely viewed and longitudinally viewed digital photos, while the fixed supporting mechanism can merely be transversely arranged. Therefore, when viewing a longitudinally viewed digital photo by using the conventional digital photo frame, the transversely arranged frame is much inconvenient, thus reducing the using convenience of the conventional digital photo frame.

SUMMARY OF THE INVENTION

Accordingly, the present invention is directed to an adjustable supporting mechanism, capable of upholding a body of an electronic apparatus on a plane and adjusting the relative position of the body and the plane.

The present invention provides an adjustable supporting mechanism, suitable for being connected to a body of an electronic apparatus, upholding the body on a plane by adapting to the center of gravity of the body, and adjusting the relative position of the body and the plane. The adjustable supporting mechanism includes a base, a bearing, an elastomer, a rotating shaft, and a supporting stand. The base is connected to the body. The bearing is fixed on the base. The elastomer is fixed on the base. The rotating shaft fits the bearing and contacts the elastomer, and rotates with respect to the base and the elastomer. When the rotating shaft rotates, the elastomer applies a resistance on the rotating shaft for resisting the rotation of the rotating shaft. The supporting stand is fixed to the rotating shaft and changes an incline angle of the body with respect to the plane with the rotation of the rotating shaft.

In an embodiment of the present invention, the body has a long edge and a short edge, and the rotating shaft is tilted with respect to the long edge and the short edge, such that the body is supported on a plane through one of the long edge and the short edge.

In an embodiment of the present invention, the base and the body are integrally formed.

In an embodiment of the present invention, the elastomer has a protruding portion, and the rotating shaft has a plurality of tooth grooves. When the rotating shaft rotates with respect to the base and the elastomer, the tooth grooves slides through the protruding portion in sequence, and the protruding portion is forced to engage into any of the tooth grooves by the elasticity of the elastomer.

In an embodiment of the present invention, the elastomer further has an elastic bent portion capable of deforming under stress. The protruding portion is disposed at a side of the elastic bent portion.

In an embodiment of the present invention, the elastomer further has an elastic cantilever capable of bending under stress. The protruding portion is located at one end of the elastic cantilever. The other end of the elastic cantilever is fixed on the base through the bearing.

In an embodiment of the present invention, the elastomer and the base are integrally formed.

In an embodiment of the present invention, the resistance is a friction.

In an embodiment of the present invention, the base has at least one first stop portion, and the rotating shaft has at least one second stop portion. The rotation angle of the rotating shaft with respect to the base is limited by the interference between the first stop portion and the second stop portion.

In an embodiment of the present invention, the adjustable supporting mechanism further includes a cap disposed on the base and covering the elastomer and the rotating shaft.

In an embodiment of the present invention, the supporting stand extends from the base towards a direction away from the base and the rotating shaft.

In the adjustable supporting mechanism of the present invention, as the rotating shaft is rotated with respect to the base and the elastomer, and the elastomer can apply a resistance on the rotating shaft for resisting the rotation of the rotating shaft, the body of the electronic apparatus using the adjustable supporting mechanism can be upheld on a plane at different relative positions. Therefore, the arrangement of the electronic apparatus can be diversified.

In order to make the objectives, features, and advantages of the present invention more clear and understandable, the present invention is illustrated in detail with reference to the following embodiments and the appended drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
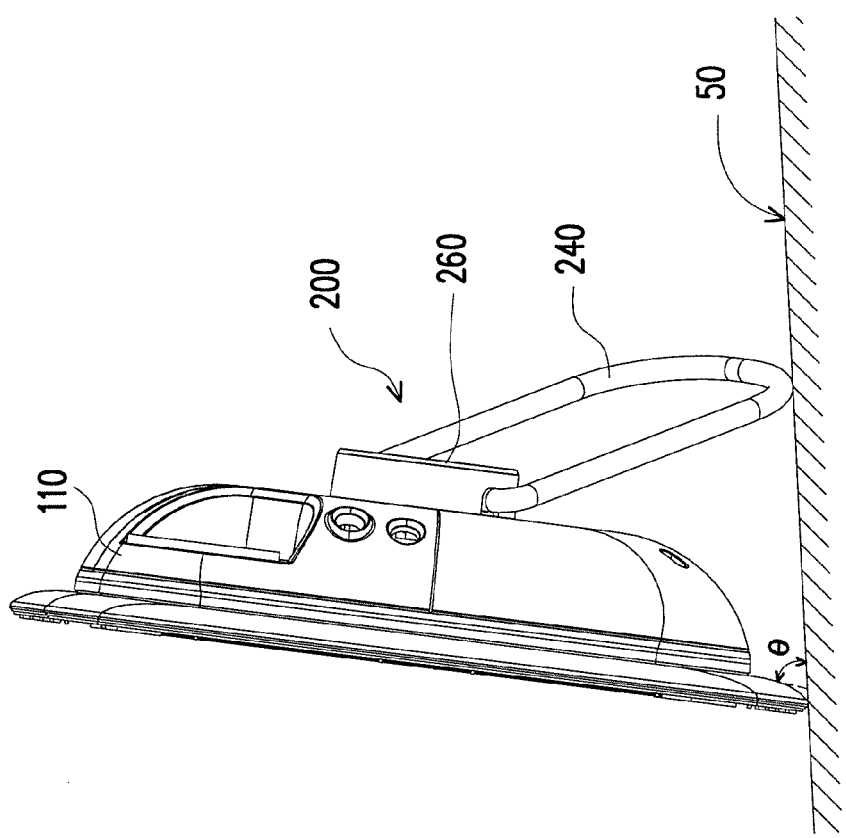
FIG. 1A is a side view of an electronic apparatus according to an embodiment of the present invention.
Figure 1B:
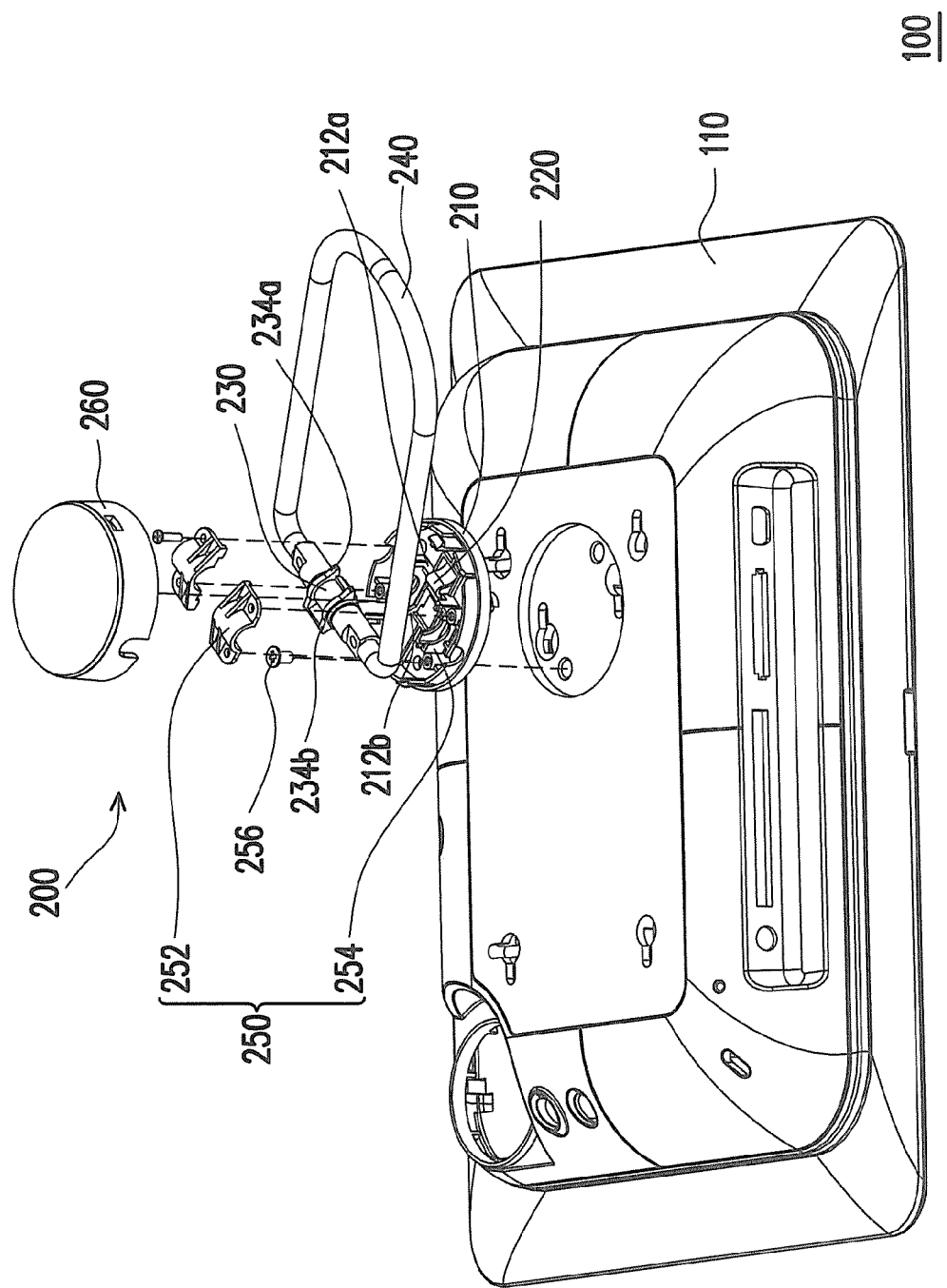
FIG. 1B is an exploded view of the electronic apparatus in FIG. 1A.
Figure 1C:
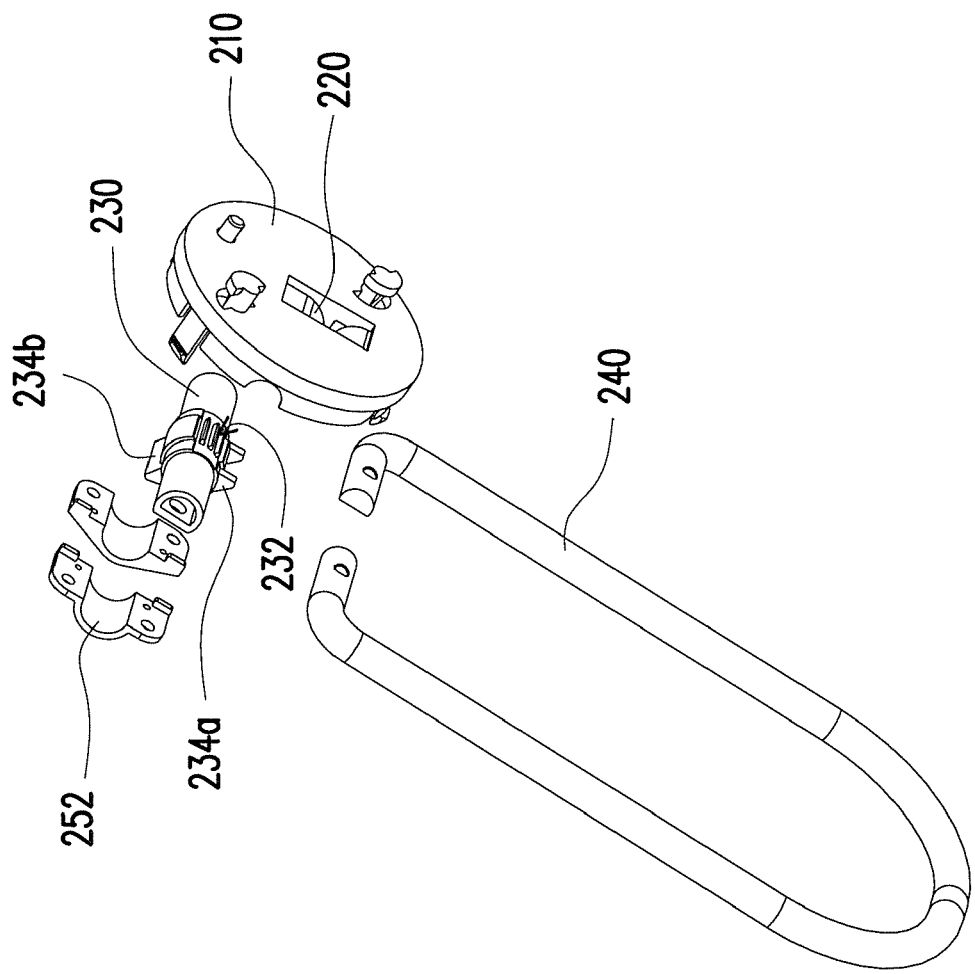
FIG. 1C is a partial exploded view of the electronic apparatus in FIG. 1B.
Figure 1D:
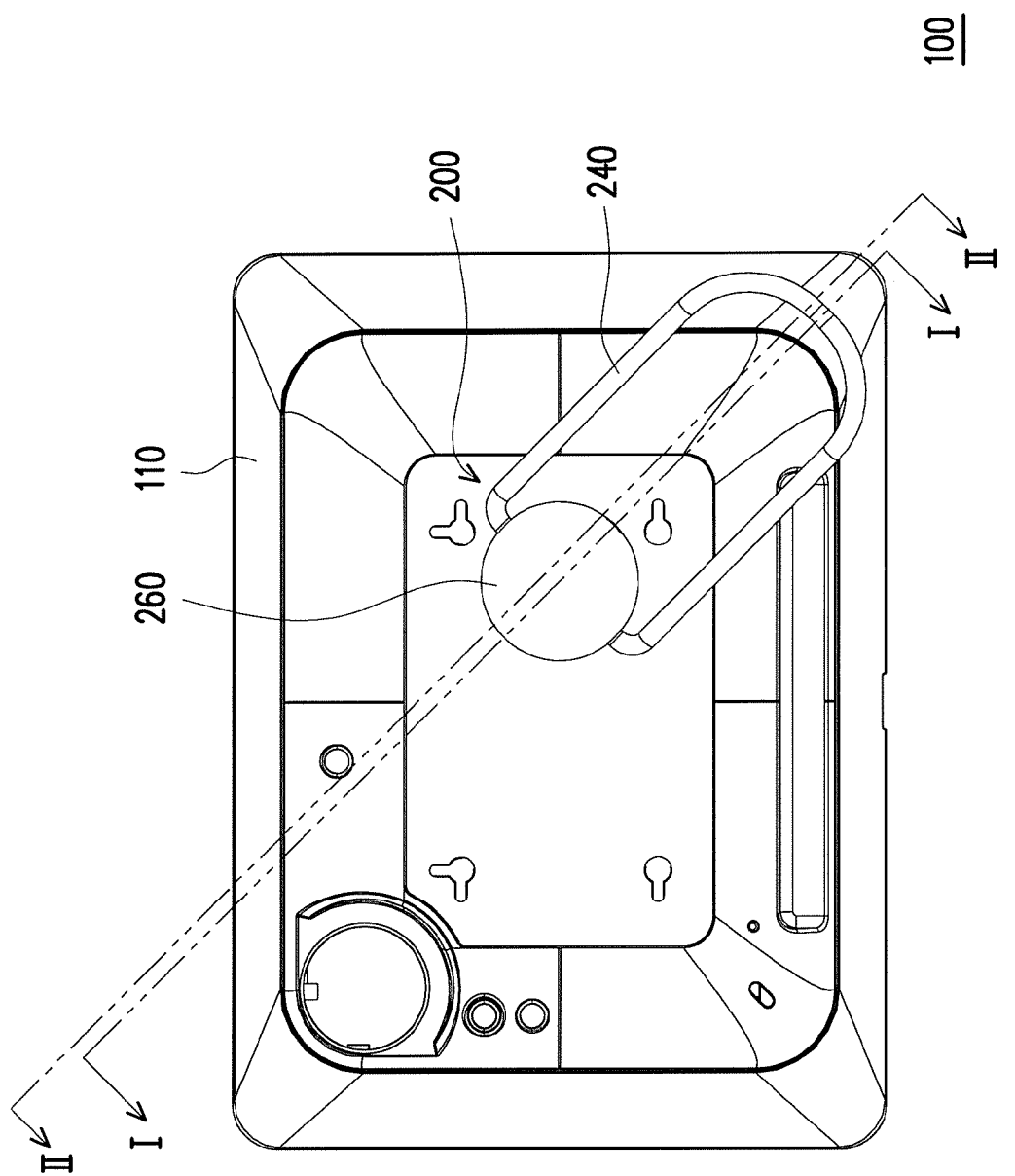
FIG. 1D is a rear view of the electronic apparatus in FIG. 1A.
Figure 1E:
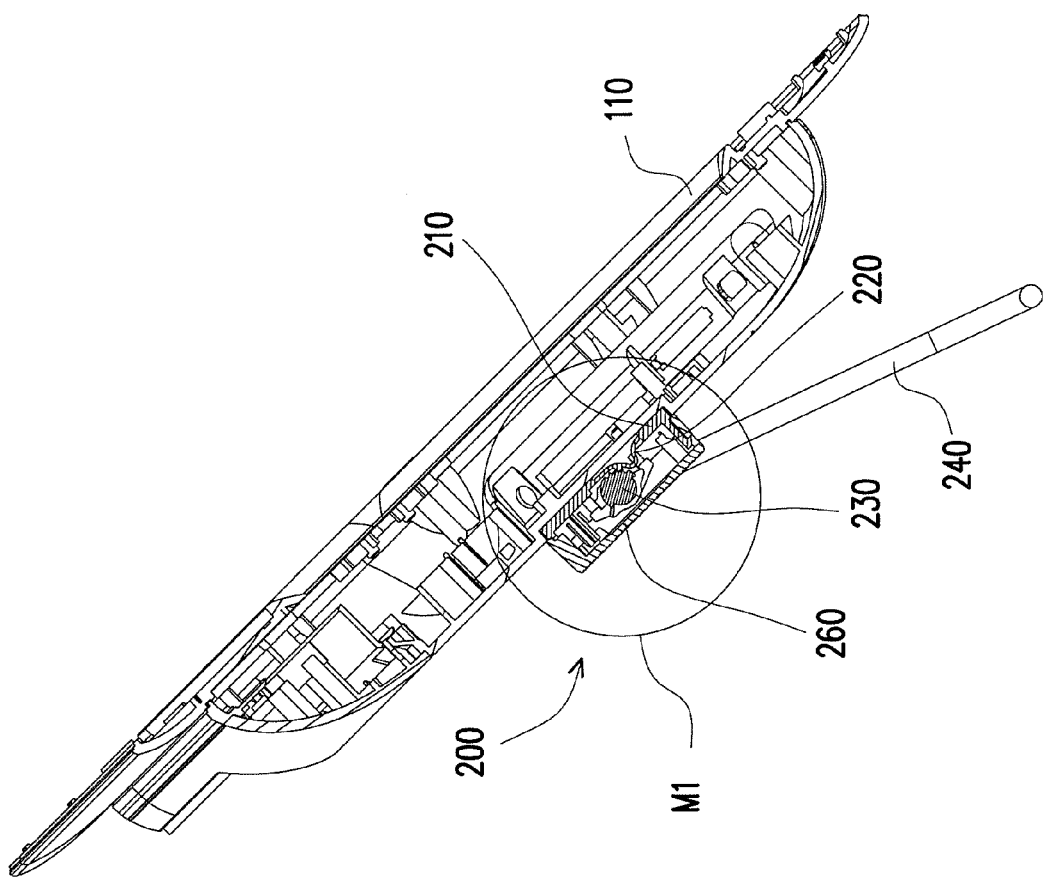
FIG. 1E is a cross-sectional view of the electronic apparatus in FIG. 1D taken along line I-I.
Figure 1F:
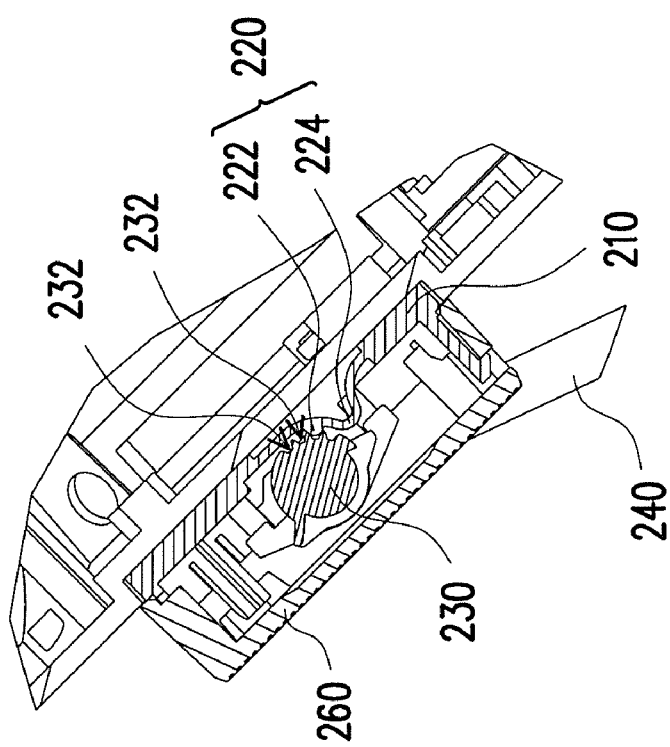
FIG. 1F is a partial enlarged view of Region M1 of the electronic apparatus in FIG. 1E.

Reference will now be made in detail to the present embodiments of the invention, examples of which are illustrated in the accompanying drawings. Wherever possible, the same reference numbers are used in the drawings and the description to refer to the same or like parts.

Referring to FIGS. 1A to 1F, the electronic apparatus 100 of this embodiment includes a body 110 and an adjustable supporting mechanism 200. In this embodiment, the electronic apparatus 100 is, for example, a digital photo frame. However, in other embodiments, the electronic apparatus 100 can also be a flat panel display or other electronic apparatus. The adjustable supporting mechanism 200 is connected to the body 110, and is suitable for upholding the body 110 on a plane 50 by adapting to the center of gravity of the body 110, and adjusting the relative position of the body 110 and the plane 50.

The adjustable supporting mechanism 200 includes a base 210, an elastomer 220, a rotating shaft 230, a supporting stand 240, and at least one bearing 250. The base 210 is connected to the body 110. The bearing 250 is fixed on the base 210. In this embodiment, the bearing 250 includes a top portion 252 and a bottom portion 254. The bottom portion 254 is fixed on the base 210, and the top portion 252 is fixed on the bottom portion 254 by a locking member 256. The elastomer 220 is fixed on the base 210. The rotating shaft 230 fits the bearing 250 and contacts the elastomer 220. The supporting stand 240 is fixed to the rotating shaft 230. In this embodiment, the supporting stand 240 extends from the base 210 towards a direction away from the base 210 and the rotating shaft 230. The rotating shaft 230 is capable of rotating with respect to the base 210 and the elastomer 220, so the supporting stand 240 is capable of changing an incline angle θ of the body 110 with respect to the plane 50 with the rotation of the rotating shaft 230.

When the rotating shaft 230 rotates, the elastomer 220 applies a resistance on the rotating shaft 230 for resisting the rotation of the rotating shaft 230. In this embodiment, the elastomer 220 has a protruding portion 222, and the rotating shaft 230 has a plurality of tooth grooves 232. When the rotating shaft 230 rotates with respect to the base 210 and the elastomer 220, the tooth grooves 232 slides through the protruding portion 222 in sequence, and the protruding portion 222 is capable of being forced to engage into any one of the tooth grooves 232 by the elasticity of the elastomer 220.

Specifically, the elastomer 220 further has an elastic bent portion 224, and the protruding portion 222 is disposed at a side of the elastic bent portion 224. When the protruding portion 222 slides out of the tooth groove 232 with the rotation of the rotating shaft 230, the elastic bent portion 224 is deformed under stress, and thus the protruding portion 222 slides out of the tooth groove 232 towards a direction away from the rotating shaft 230. Next, when the protruding portion 222 reaches the next tooth groove 232 with the continuous rotation of the rotating shaft 230, the shape of the elastic bent portion 224 is recovered by the elasticity thereof, and thus the protruding portion 222 is forced to engage into the next tooth groove 232.

Figure 2A:
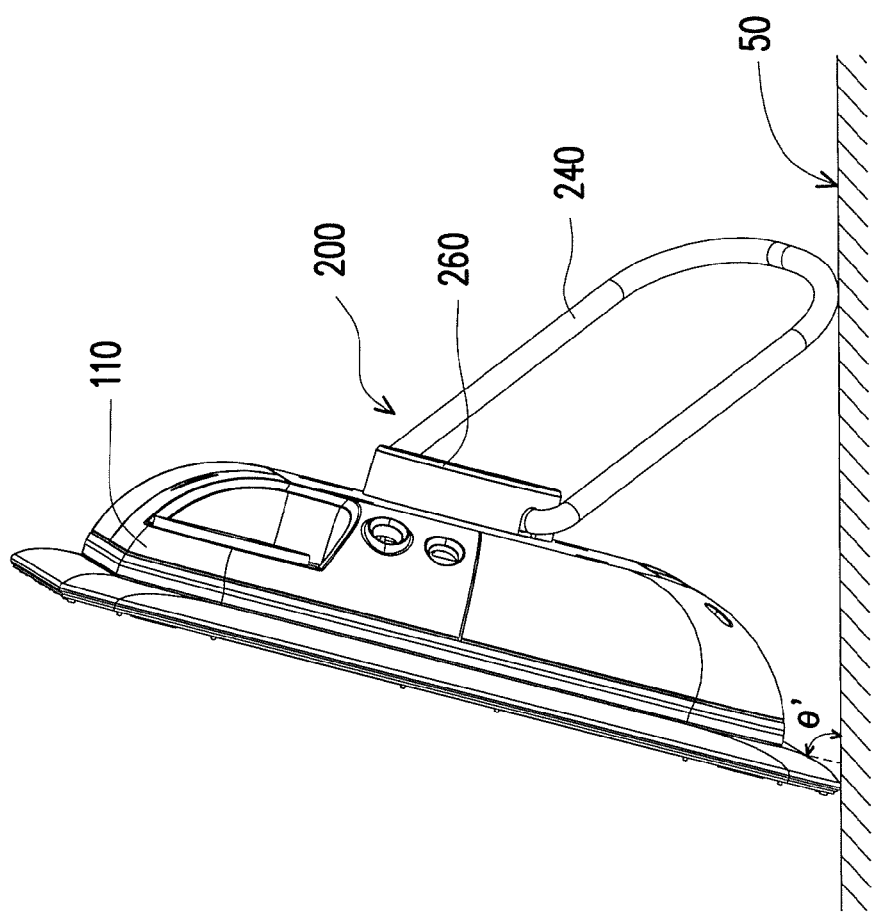
FIGS. 2A and 2B show a body of the electronic apparatus in FIG. 1A being tilted with respect to a plane in other two angles.
Figure 2B:
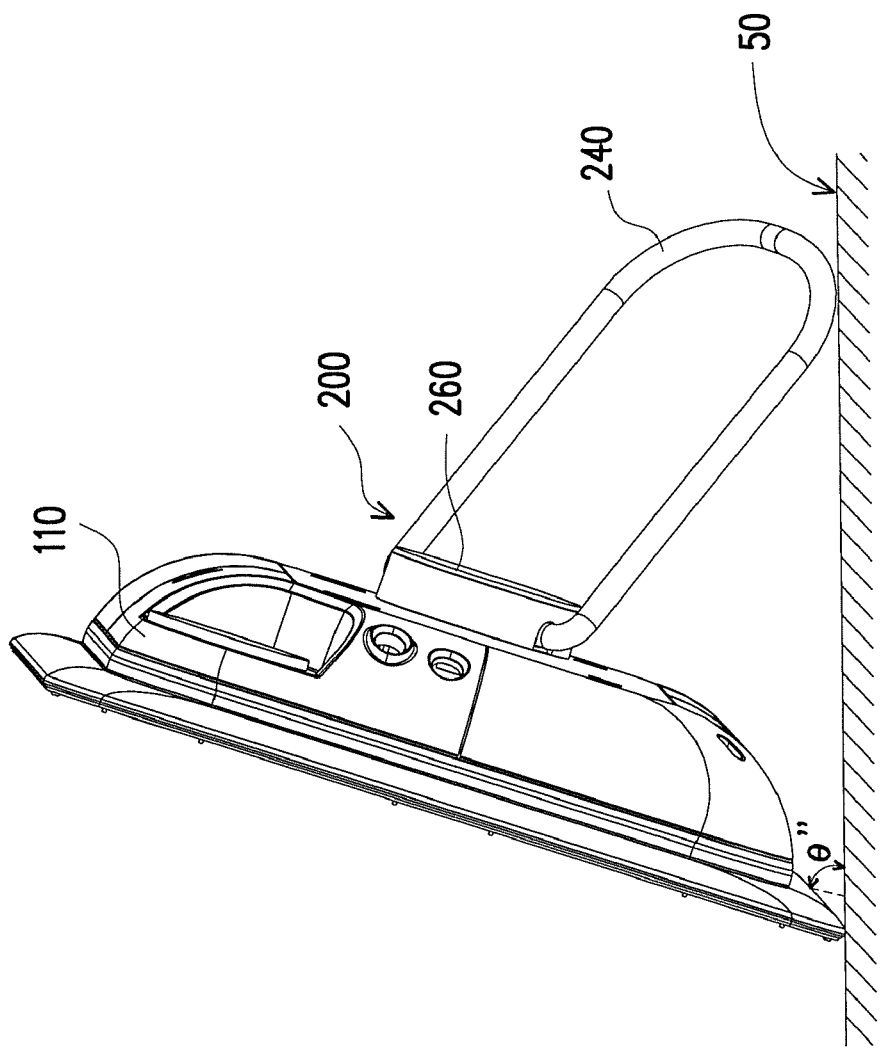

As the departure of the protruding portion 222 from the tooth groove 323 is resisted by the elasticity of the elastic bent portion 224, and the protruding portion 222 interferes with a sidewall of the tooth groove 232, the elastomer 220 and the sidewall of the tooth groove 232 will apply a resistance for resisting the rotation of the rotating shaft 230. Accordingly, the rotating shaft 230 can be engaged at a plurality of specific angles, such that the supporting stand 240 is capable of upholding the body 110 on the plane 50, and the body 110 is capable of being tilted by a plurality of specific incline angles with respect to the plane 50, such that the arrangement of the electronic apparatus 100 is diversified. FIGS. 2A and 2B show the body 110 of the electronic apparatus 100 in FIG. 1A tilted with respect to the plane 50 by other two angles. Referring to FIGS. 1A, 2A, and 2B, the incline angle θ of the body 110 in FIG. 1A with respect to the plane 50 is greater than an incline angle θ' in FIG. 2A, and the incline angle θ' in FIG. 2A is greater than an incline angle θ" in FIG. 2B.

Referring to FIG. 1A to FIG. 1F again, in this embodiment, the adjustable supporting mechanism 200 further includes a cap 260 disposed on the base 210 and covering the elastomer 220 and the rotating shaft 230. Further, in this embodiment, the base 210 and the body 110 are formed individually. However, in other embodiments, the base 210 and the body 110 can also be integrally formed. Furthermore, in this embodiment, the elastomer 220 and the base 210 are integrally formed. However, in other embodiments (not shown), the elastomer 220 and the base 210 can also be formed individually.

Figure 3A:
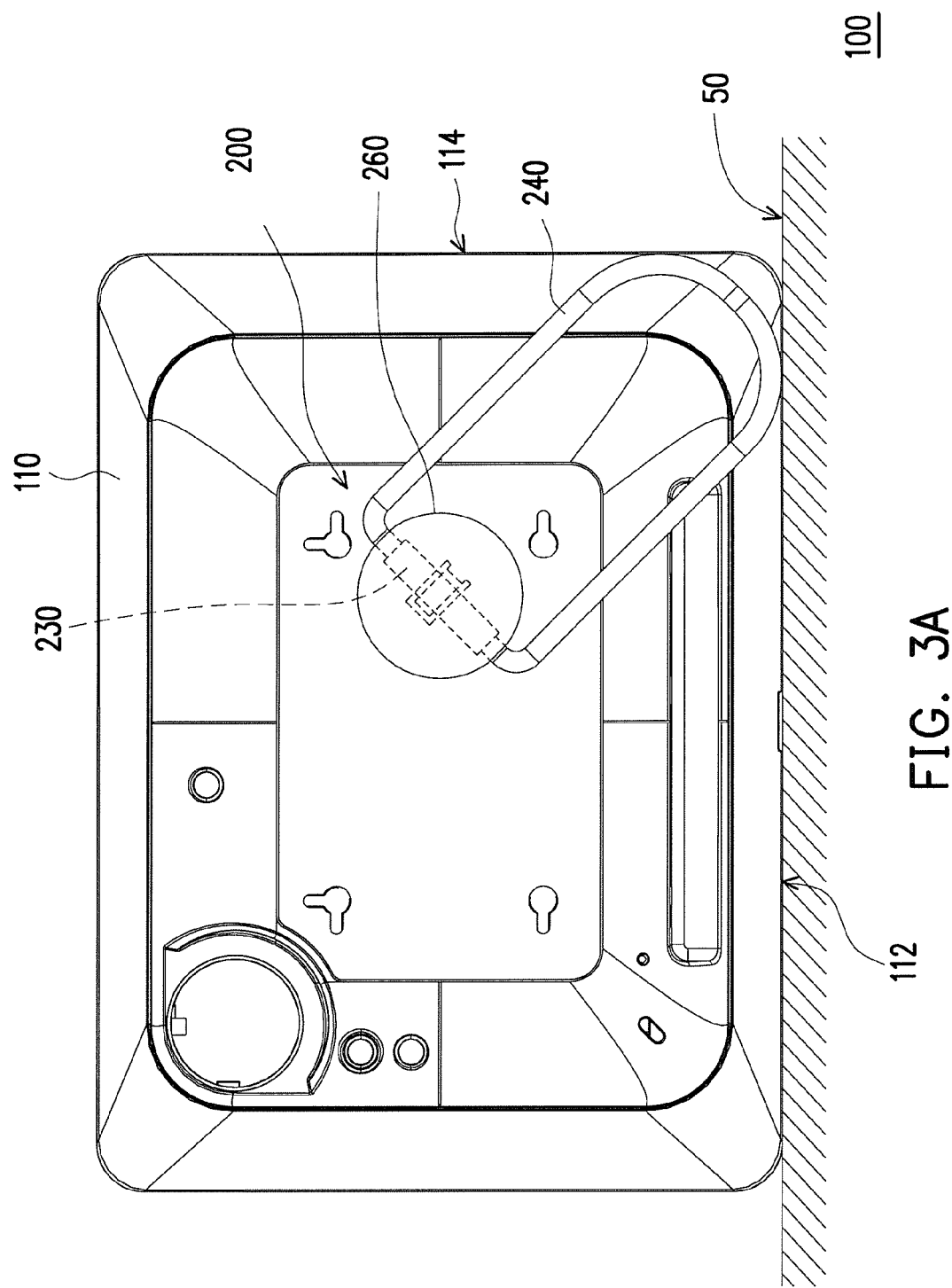
FIGS. 3A and 3B show the electronic apparatus in FIG. 1A being disposed transversely and vertically on the plane, respectively.
Figure 3B:
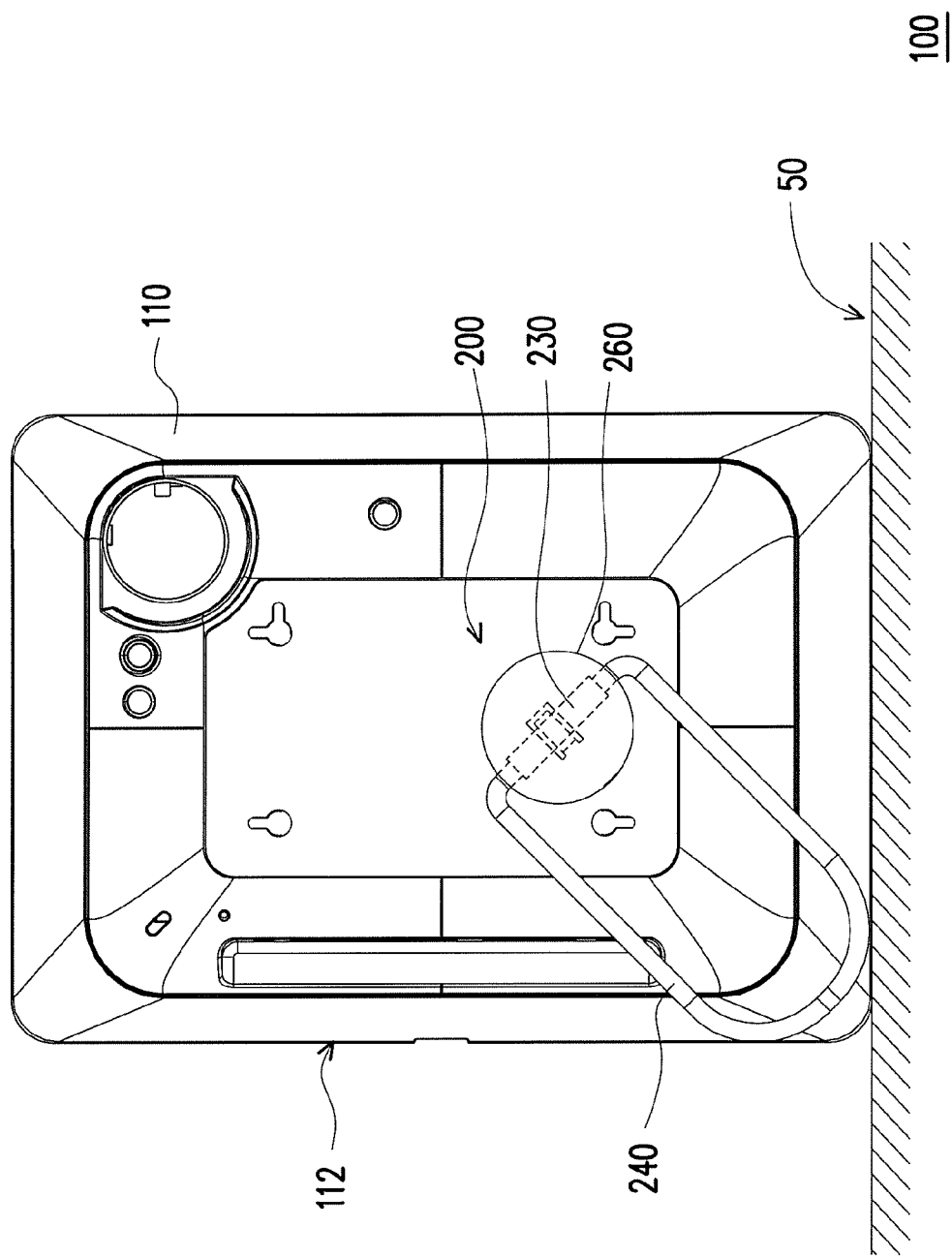
Figure 4A:
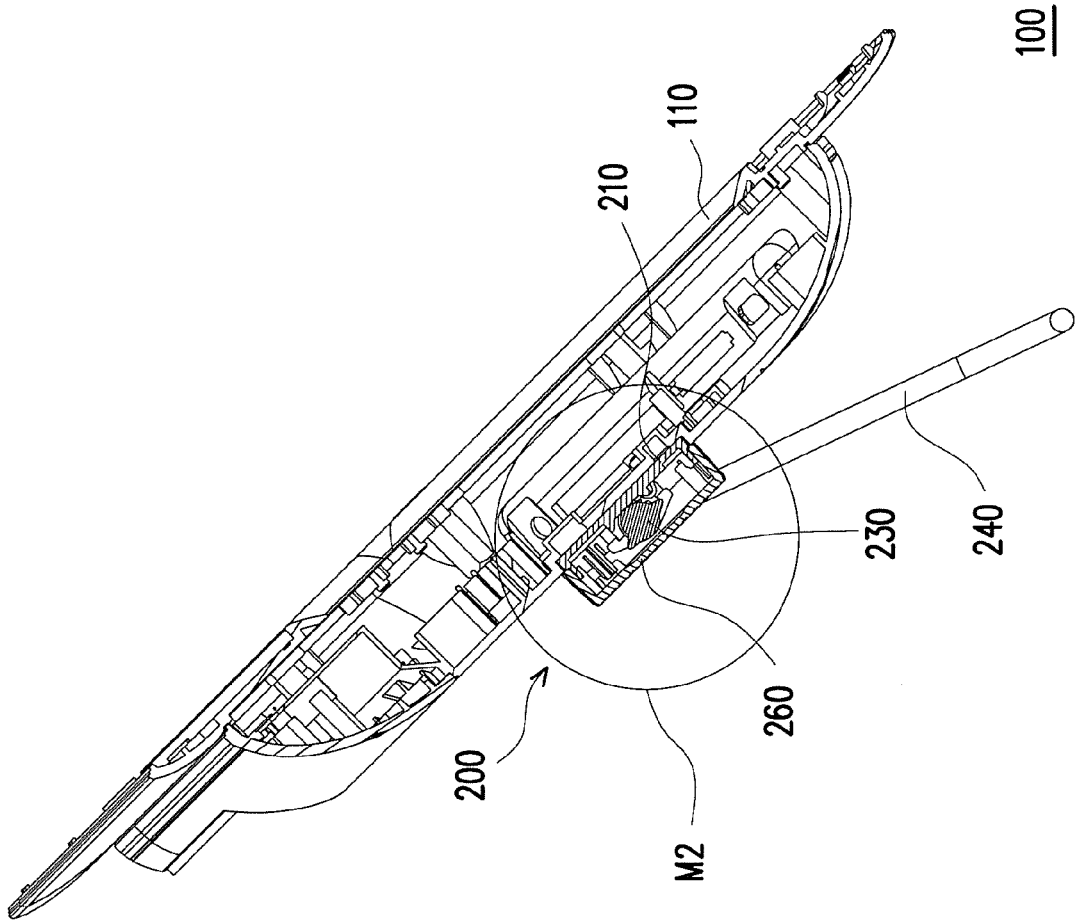
FIG. 4A is a cross-sectional view of the electronic apparatus in FIG. 1D taken along line II-II.
Figure 4B:
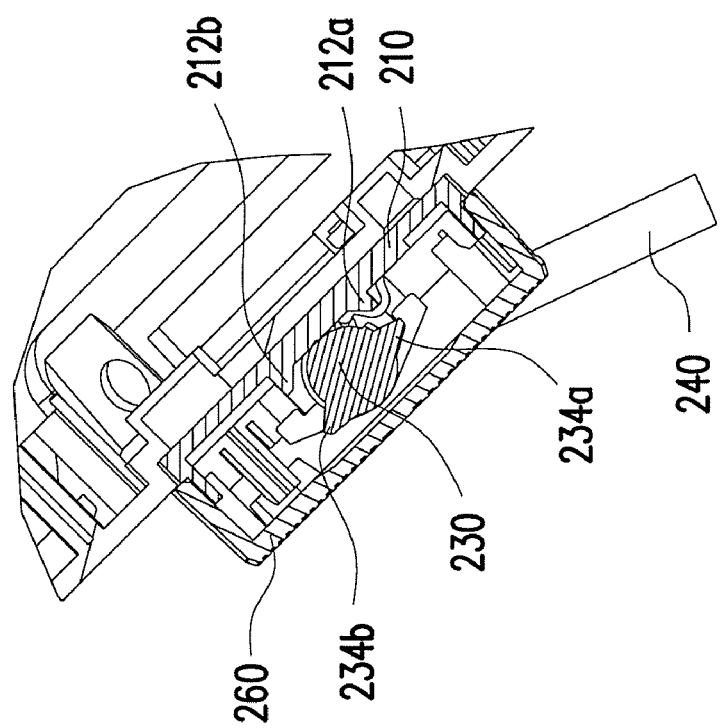
FIG. 4B is a partial enlarged view of Region M2 of the electronic apparatus in FIG. 4A.

FIGS. 3A and 3B show the electronic apparatus in FIG. 1A being disposed transversely and vertically on a plane, respectively. Referring to FIGS. 3A and 3B, in this embodiment, the body 110 has a long edge 112 and a short edge 114, and the rotating shaft 230 can be tilted with respect to the long edge 112 and the short edge 114, such that the projection of the supporting stand 240 on the back of the body 110 is tilted with respect to the long edge 112 and the short edge 114. Therefore, the body 110 can be supported on the plane 50 through one of the long edge 112 and the short edge 114. In FIG. 3A, the body 110 is supported on the plane 50 through the long edge 112, that is, the electronic apparatus 100 is transversely placed on the plane 50. In FIG. 3B, the body 110 is supported on the plane 50 through the short edge 114, that is, the electronic apparatus 100 is vertically placed on the plane 50. Therefore, the user can place the electronic apparatus 100 transversely or vertically with the transversely or longitudinally viewed image frames displayed by the electronic apparatus 100, so as to improve the using convenience of the electronic apparatus 100.

Referring to FIGS. 4A, 4B, 5A, 5B, 6A, and 6B, in this embodiment, the base 210 has first stop portions 212a and 212b, and the rotating shaft 230 has second stop portions 234a and 234b. The rotation angle of the rotating shaft 230 with respect to the base 210 is limited by the interference between the first stop portions 212a, 212b and the second stop portions 234a, 234b.

Figure 5A:
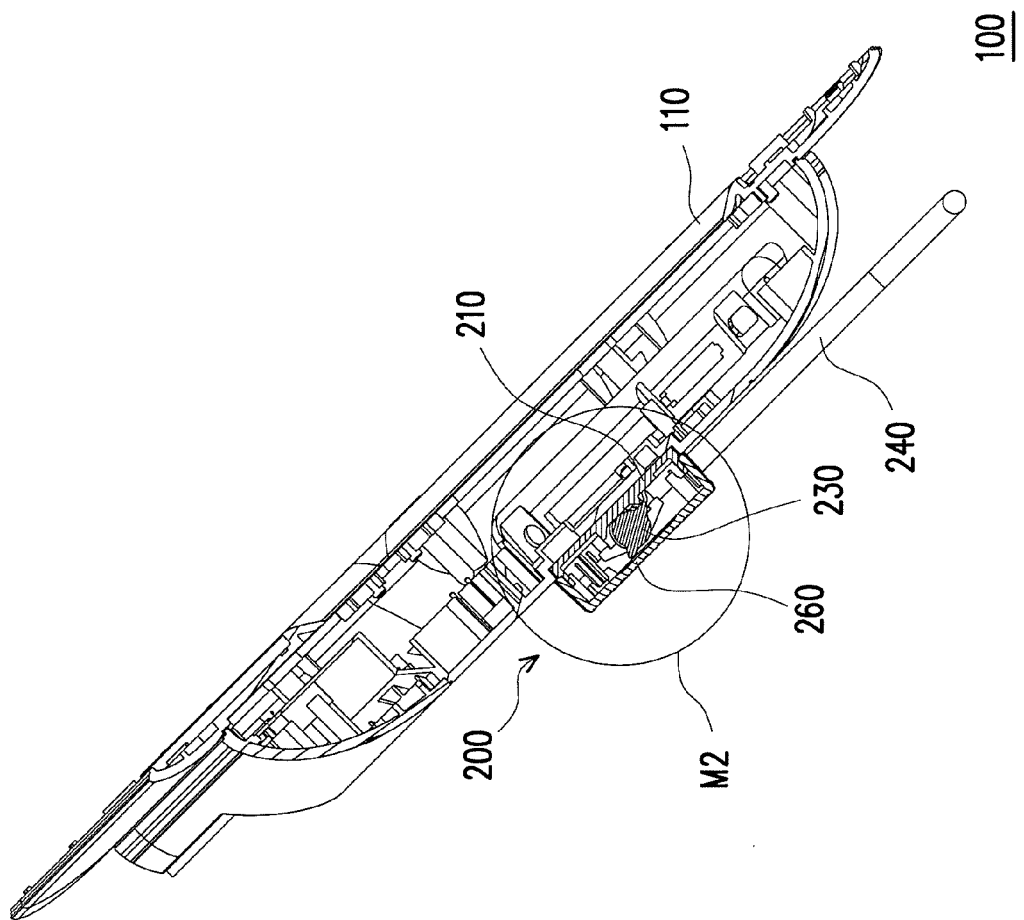
FIGS. 5A and 6A show two states of the interference of a first stop portion and a second stop portion of the electronic apparatus in FIG. 4A.
Figure 5B:
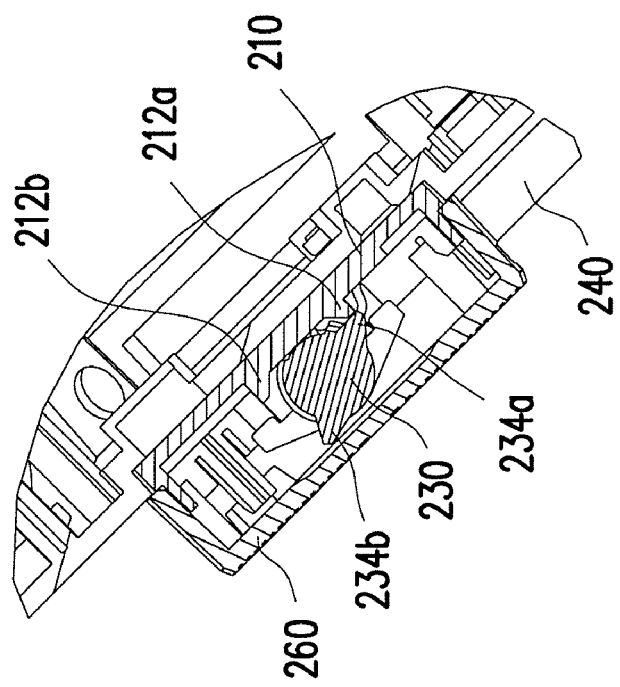
FIGS. 5B and 6B are partial enlarged views of Region M2 of the electronic apparatus in FIGS. 5A and 6A, respectively.
Figure 6A:
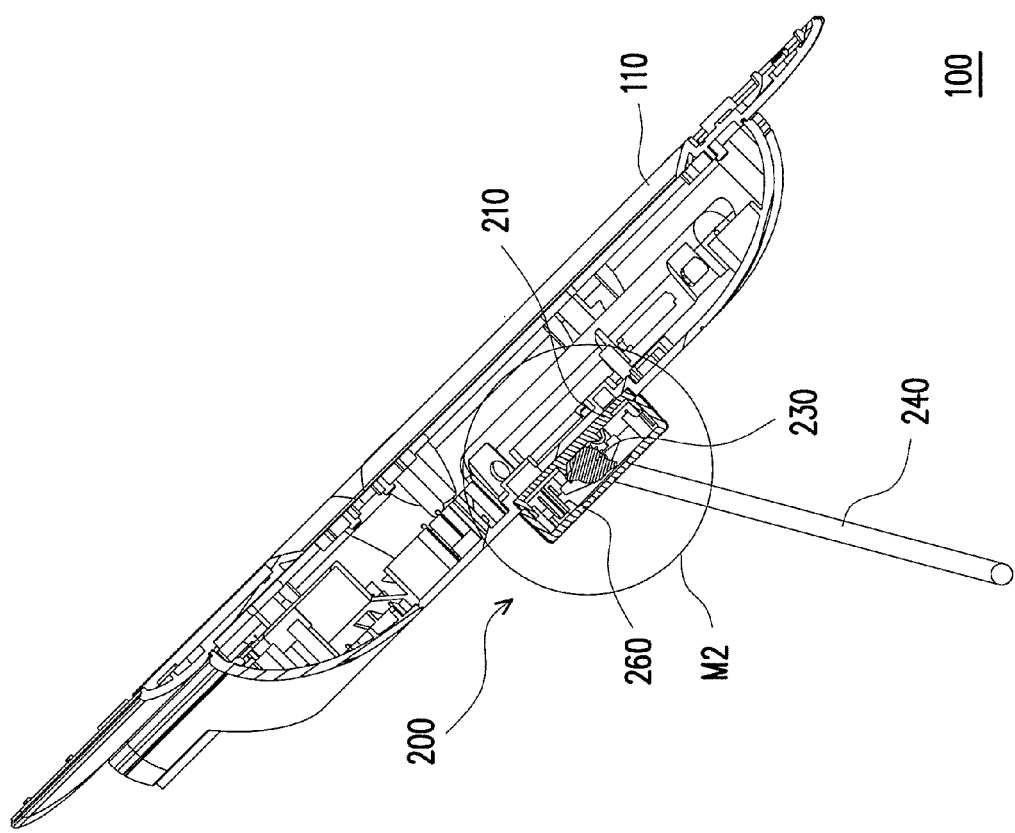
Figure 6B:
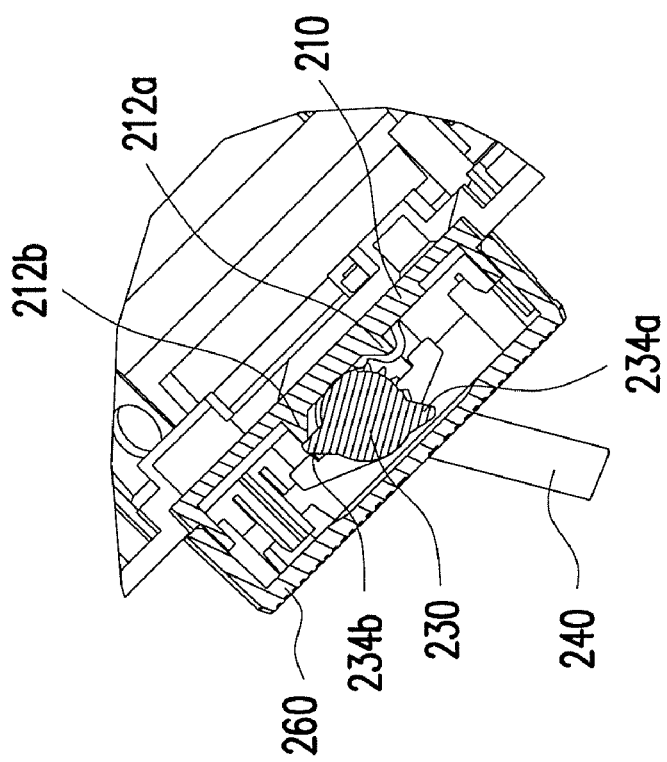
Figure 7A:
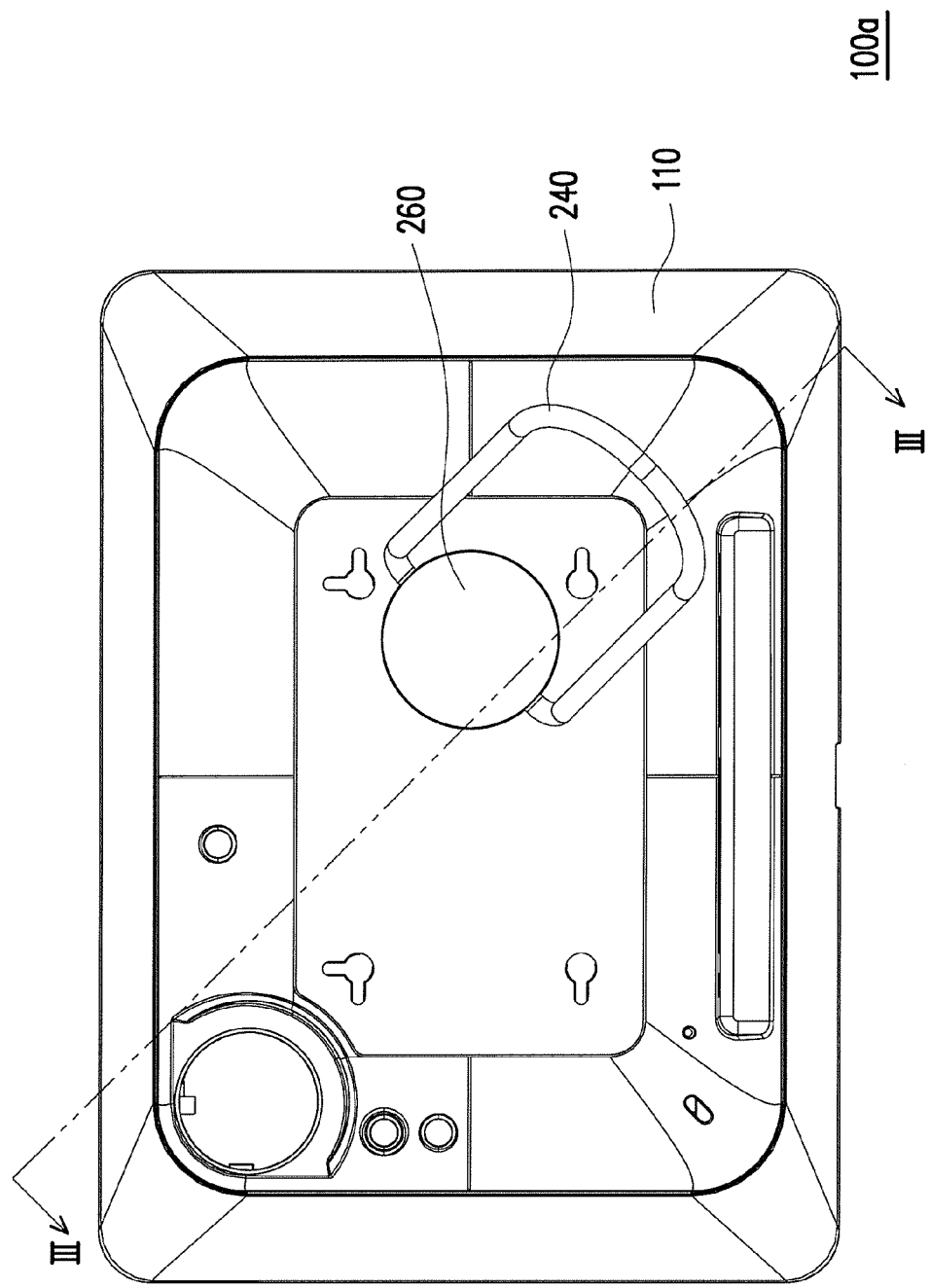
FIG. 7A is a rear view of an electronic apparatus according to another embodiment of the present invention.
Figure 7B:
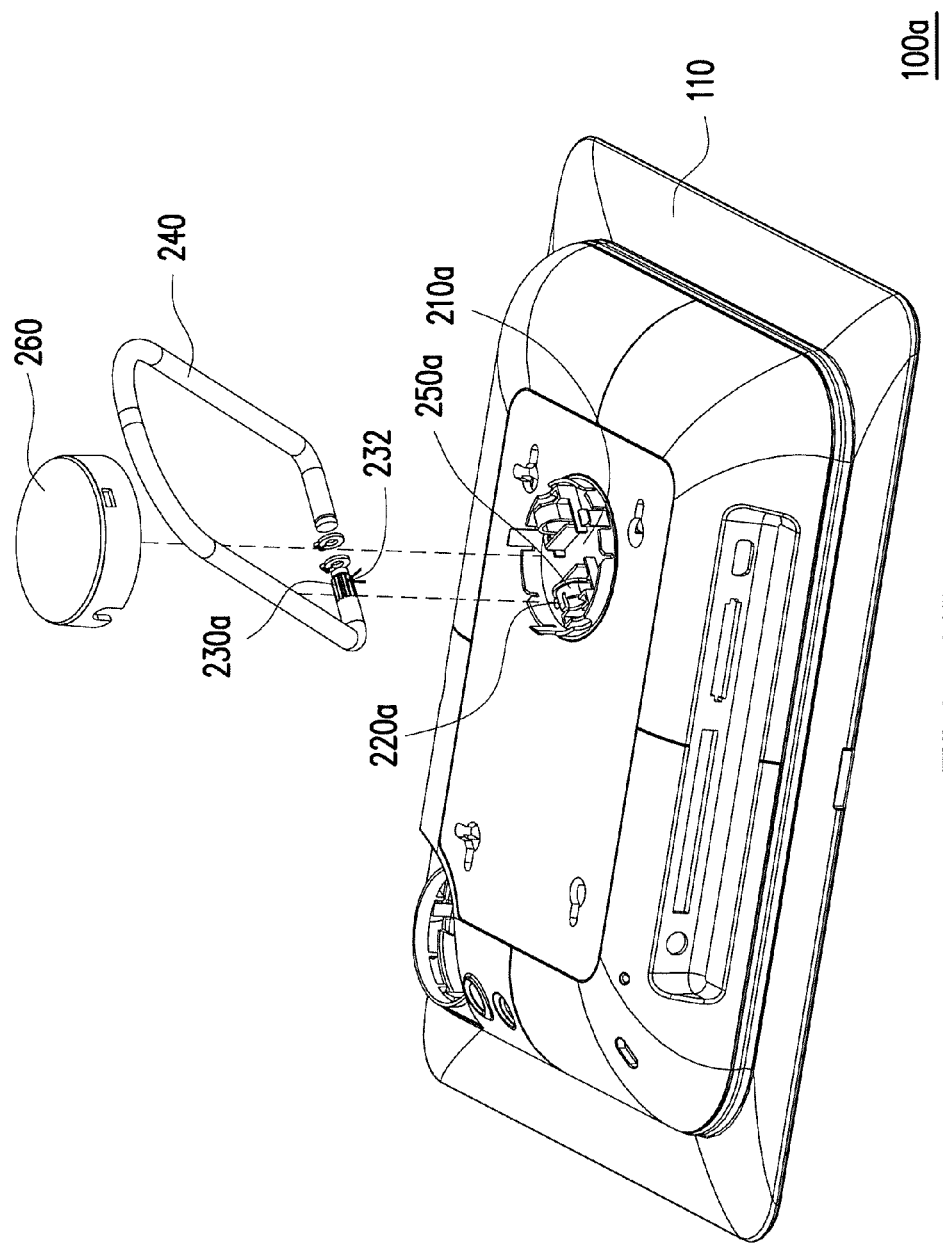
FIG. 7B is an exploded view of the electronic apparatus in FIG. 7A.
Figure 7C:
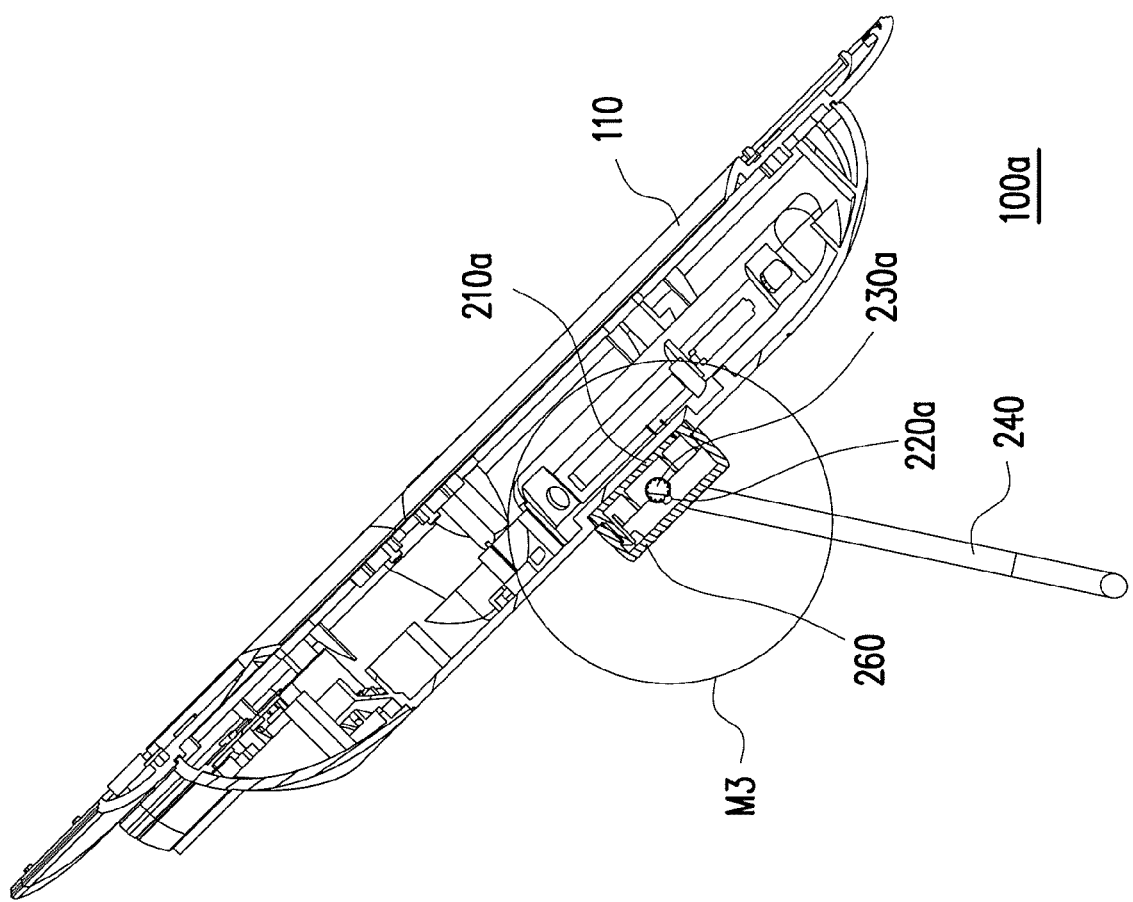
FIG. 7C is a cross-sectional view of the electronic apparatus in FIG. 7A taken along line III-III.
Figure 7D:
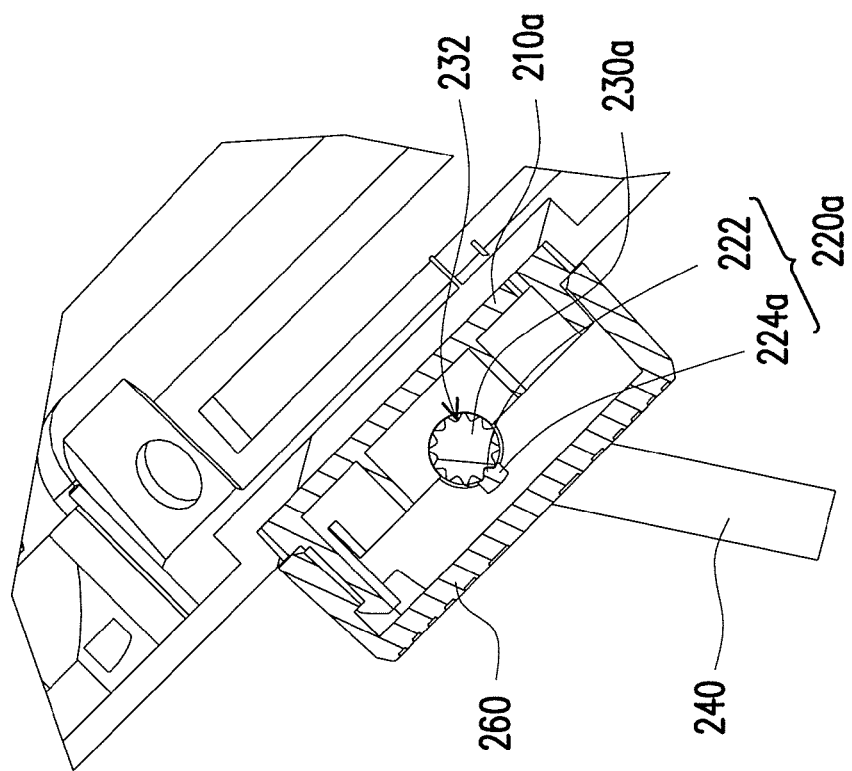
FIG. 7D is a partial enlarged view of Region M3 of the electronic apparatus in FIG. 7C.

For example, when the rotating shaft 230 rotates to the states shown in FIGS. 5A and 5B, the second stop portion 234a abuts against the first stop portion 212a, such that the rotating shaft 230 cannot rotate towards the counter-clockwise direction in the figure continuously. When the rotating shaft 230 rotates to the states in FIGS. 6A and 6B, the second stop portion 234b abuts against the first stop portion 212b, such that the rotating shaft 230 cannot rotate towards the clockwise direction in the figure continuously. Therefore, the rotation of the rotating shaft 230 is limited at a state between the state in FIG. 5A and the state in FIG. 6A. Therefore, the rotating shaft 230 is capable of rotating within an appropriate angle range, such that the supporting stand 240 moves within an appropriate position range with respect to the body 110.

It should be noted that, according to the present invention, the resistance for resisting the rotation of the rotating shaft 230 is not limited to be the interference between the sidewall of the groove 232 and the protruding portion 224 or the elasticity of the elastic bent portion 224. In other embodiments (not shown), the rotating shaft can have no grooves, the elastomer can have no protruding portion, and the resistance for resisting the rotation of the rotating shaft can be the friction between the surface of the rotating shaft and the surface of the elastomer.

Referring to FIGS. 7A to FIG. 7D, the electronic apparatus 100a of this embodiment is similar to the electronic apparatus 100 (referring to FIG. 1E), and the main difference therebetween is as follows. In the electronic apparatus 100a of this embodiment, an elastomer 220a has an elastic cantilever 224a to replace the elastic bent portion 224 in FIG. 1E, and the protruding portion 222 is located at one end of the elastic cantilever 224a.

In this embodiment, the other end of the elastic cantilever 224a is fixed on a base 210a through a bearing 250a. When the protruding portion 222 slides out of the tooth groove 232 with the rotation of a rotating shaft 230a, the elastic cantilever 224a is deformed under stress, such that the protruding portion 222 slides out of the tooth groove 232 towards a direction away from the rotating shaft 230a. Next, when the protruding portion 222 reaches the next tooth groove 232 with the continuous rotation of the rotating shaft 230a, the shape of the elastic cantilever 224a is recovered by the elasticity thereof, such that the protruding portion 222 is forced to engage into the next tooth groove 232.

In view of the above, in the adjustable supporting mechanism of the present invention, as the rotating shaft is capable of rotating with respect to the base and the elastomer, and the elastomer applies a resistance on the rotating shaft for resisting the rotation of the rotating shaft, the body of an electronic apparatus using the adjustable supporting mechanism can be upheld on a plane at different incline angles and different relative positions. Therefore, the arrangement of the electronic apparatus can be diversified. Furthermore, in an electronic apparatus according to an embodiment of the present invention, the rotating shaft is tilted with respect to the long edge and the short edge of the body of the electronic apparatus, and thus the electronic apparatus can be placed transversely and vertically, thereby improving the using convenience of the electronic apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjustable supporting mechanism, suitable for being connected to a body of an electronic apparatus which disposed on a plane, the adjustable supporting mechanism comprising:
   a base connected to the body;
   a bearing fixed on the base;
   an elastomer fixed on the base;
   a rotating shaft, fitted the bearing, contacted the elastomer, and rotated with respect to the base and the elastomer, wherein when the rotating shaft rotates, the elastomer applies a resistance on the rotating shaft for resisting the rotation of the rotating shaft; and
   a supporting stand, connected to the rotating shaft, and changed an incline angle between the body and the plane with the rotation of the rotating shaft,
   wherein the elastomer has a protruding portion, and the rotating shaft has a plurality of tooth grooves, when the rotating shaft rotates with respect to the base and the elastomer, the tooth grooves slide through the protruding portion in sequence, and the protruding portion is forced to engage into any one of the tooth grooves by the elasticity of the elastomer.

2. The adjustable supporting mechanism according to claim 1, wherein the elastomer further has an elastic bent portion, and the protruding portion is disposed at a side of the elastic bent portion.

3. The adjustable supporting mechanism according to claim 1, wherein the elastomer further has an elastic cantilever, and the protruding portion is located at one end of the elastic cantilever.

4. The adjustable supporting mechanism according to claim 3, wherein the other end of the elastic cantilever is fixed on the base through the bearing.

5. The adjustable supporting mechanism according to claim 1, wherein the elastomer and the base are integrally formed.

6. The adjustable supporting mechanism according to claim 1, wherein the resistance is a friction.

7. The adjustable supporting mechanism according to claim 1, wherein the base has at least one first stop portion, and the rotating shaft has at least one second stop portion, the rotation angle of the rotating shaft with respect to the base is limited by the interference between the first stop portion and the second stop portion.

8. The adjustable supporting mechanism according to claim 1, further comprising a cap, disposed on the base and covering the elastomer and the rotating shaft.

9. The adjustable supporting mechanism according to claim 1, wherein the supporting stand extends from the base towards a direction away from the base and the rotating shaft.

10. The adjustable supporting mechanism according to claim 1, wherein the body has a long edge and a short edge, and the rotating shaft is tilted with respect to the long edge and the short edge, such that the body is supported on the plane through one of the long edge and the short edge.

11. The adjustable supporting mechanism according to claim 1, wherein the base and the body are integrally formed.

* * * * *